United States Patent [19]

Meyer et al.

[11] 3,712,012
[45] Jan. 23, 1973

[54] REINFORCED-CONCRETE PRESSURE VESSEL WITH LINING

[75] Inventors: Joachim Meyer; Josef Pfeffer, both of Essen, Germany

[73] Assignee: Fried Krupp Gesellschaft mit beschrankter Haftung, Essen, Germany

[22] Filed: Nov. 4, 1970

[21] Appl. No.: 86,838

Related U.S. Application Data

[63] Continuation-in-part of Ser. No. 34,081, May 4, 1970.

[30] Foreign Application Priority Data

Nov. 5, 1969 Germany......................P 19 55 570.5

[52] U.S. Cl. .....................52/249, 52/245, 165/169
[51] Int. Cl. .................................................F28f 3/12
[58] Field of Search ..........52/245, 249; 165/47, 169; 176/65, 88

[56] References Cited

UNITED STATES PATENTS

| 1,817,104 | 8/1931 | Schaefer | 52/245 |
| 3,449,084 | 6/1969 | Smoot et al. | 52/249 |
| 3,454,080 | 7/1969 | Kunzli | 165/136 |
| 3,424,239 | 1/1969 | Coudray | 165/169 |
| 3,589,088 | 6/1971 | Seidl | 176/87 |
| 3,523,203 | 8/1970 | Whitney | 165/47 |

FOREIGN PATENTS OR APPLICATIONS

| 1,408,372 | 7/1965 | France | 176/87 |

*Primary Examiner*—Frank L. Abbott
*Assistant Examiner*—Leslie A. Braun
*Attorney*—Karl F. Ross

[57] ABSTRACT

A reinforced-conrete vessel adapted to withstand pressure, e.g. for a pressurized-fluid nuclear reactor, has an inner lining of corrosion-resistant (stainless) steel having vertically or horizontally-running corrugations, the crests of which are supported by steel profiles.

9 Claims, 2 Drawing Figures

PATENTED JAN 23 1973  3,712,012
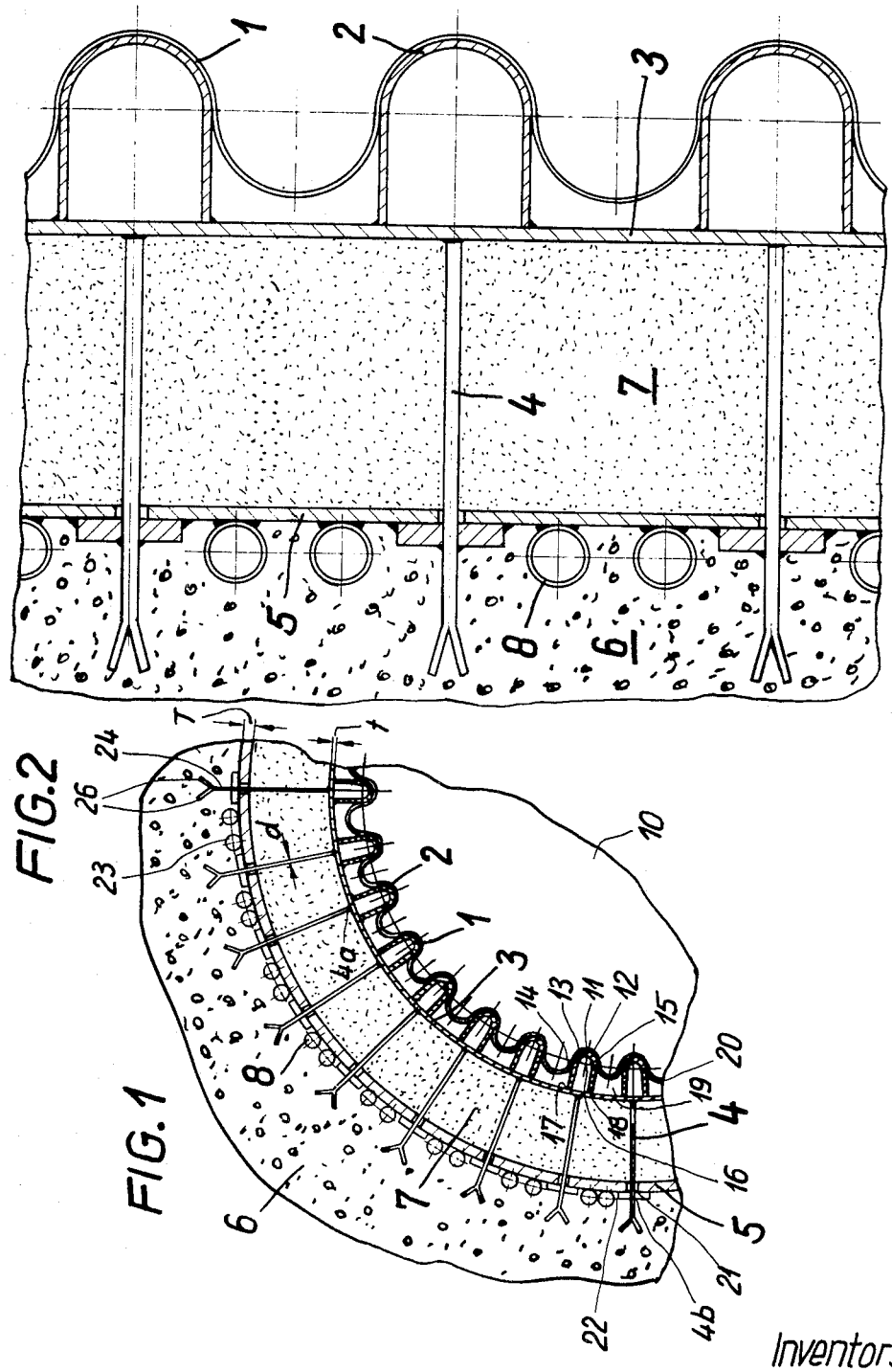
Inventors:
Joachim Meyer
Josef Pfeffer
By  Karl F. Ross
Attorney

REINFORCED-CONCRETE PRESSURE VESSEL WITH LINING

1. CROSS REFERENCE TO RELATED APPLICATION

This application is a continuation-in-part of our application Ser. No.34,081 filed 4 May 1970 and entitled Pressure-Retentive Vessel, E.G. for Pressure-Fluid Nuclear Reactors.

2. FIELD OF THE INVENTION

Our present invention relates to reinforced-concrete vessels of the pressure-retentive type which are internally lined with a metal shell and, more particularly, to an improved lining for a reinforced-concrete pressure vessel adapted to constitute an enclosure for a nuclear reactor.

3. BACKGROUND OF THE INVENTION

It has been proposed to provide large-sized reinforced-concrete pressure vessels for pressurized-fluid nuclear reactors. In such vessels, it is common to provide an internal lining or shell which is hermetically sealed to prevent the escape of radioactive contaminants in the event of a breakdown in the reactor core or some other accident or damage to the system. Since reactors operate at relatively high temperatures, it is necessary to prevent the heat transmitted through the metal lining from detrimentally acting upon the outer concrete shell, which suffers breakdown, we have found, when exposed for prolonged periods to temperatures of 80° C. and above. Furthermore, the vessel must withstand temperature variations which are considerable since temperatures ranging from room temperature before the operation of the reactor and thereafter, to the operating temperatures of 300° C. or above. The mechanical stress accompanied by such thermal variations has often lead to difficulties in maintaining a tightly sealed structure. Finally, the inner lining must be in force-transmitting relationship with the outer shell or some other means for withstanding catastrophic pressure increases as may arise with nuclear reactors. Hence, complex considerations enter into the design of a pressure vessel, beyond the factors of shielding and mechanical containment of radioactive contaminants. Prior art structures have been insufficient in some or all of the above-mentioned respects. For example, a tightly sealed metal vessel forming a conventional inner lining for a concrete structure adapted to contain a nuclear reactor core, may be insufficiently flexible to accommodate the thermal expansion and contraction stresses and/or may be insufficiently resistant to corrosion and/or may be incapable of transmitting outward forces to the surrounding shell and of limiting the danger of environmental contamination upon a catastrophic occurrence and/or may be excessively expensive and difficult to erect. On the latter points, attention must be directed to the fact that, when stainless steels and like corrosion-resistant materials are to be employed, the cost of the material is a significant factor and every effort must be made to minimize the amount of material to be employed if the reactor cost is to be held within reasonable bounds.

4. Application Ser. No.34,081

In our application Ser. No.34,081 mentioned earlier, we have disclosed a system which overcomes some, if not all, of the aforementioned disadvantages. The system of that application is a pressure-retentive vessel which includes a massive body of concrete surrounding the enclosed chamber, and a lining structure interposed between this body and the chamber. The lining is of the double-wall type and comprises an inner, relatively thin sheet-metal shell of a metal of low corrodability, welded from cylindrical segments into an inner vessel preventing escape of radio-active materials from the compartment enclosed thereby. This thin-walled vessel constitutes a membrane which can be flexed by pressure within the vessel and we provide, therefore, as a low-thermal-conductivity means for transmitting the forces from the inner vessel to the outer vessel, a multiplicity of angularly equispaced rods which may be axially distributed or spaced as well, the rods preferably having a thickness (diameter) equal to or approximating the wall thickness of the inner vessel. The rods are substantially rigidly fixed to the outer relatively thick metal shell and the latter is welded together from cylinder segments and can be composed of a structural metal which need not be as expensive as the noncorroding metal of the inner shell. The pressure-vessel liner of that application can thus be exposed to a fluid medium at a high temperature and of a corrosive nature, may be subjected to high internal temperatures without increasing the danger of breakdown of surrounding concrete structures and may be used without fear of breakdown of the outer structural metal lining while allowing the entire assembly to be erected at the construction site in whole or in part prior to casting of the prestressed concrete outer mass.

The system may thus include a concentric (coaxial) inner liner arrangement having an inner wall composed of corrosion-resistant material, e.g. a stainless steel or monel, and an outer wall of the liner composed of structural steel. The inner and outer walls of the liner are radially spaced by a multiplicity of small-cross-section members defining a substantially rigid structure. These supporting and spacer members of the liner serve to limit the span of the inner wall which is subject to outward buckling pressure from the enclosed fluid. When the distance (axial or angular) between these generally radial members of the liner is sufficiently small, the thickness of the inner wall can be reduced to a small fraction of that of the outer wall of the liner. Preferably, the inner wall has a thickness which is less than half that of the outer wall.

The outer shell, which spacedly surrounds the inner lining, may be formed with openings through which connecting rods extend, the clearance between the members and the walls of the openings being blocked or sealed by bridge pieces welded along the outer surface of the outer shell. The connecting rods themselves are preferably welded to the outer wall of the inner lining. Advantageously, projecting portions of the connecting members extend radially beyond the outer shell and into the surrounding concrete body where they are anchored in the mass of concrete and serve to transmit the internal pressure load to this reinforced concrete shell. The interwall space between the relatively thin inner lining and the relatively thick outer shell, is filled with a rigid insulating material, e.g. so-called insulating concrete serving to reduce transmission of heat to the outer shell and, therefore, to the concrete body therebeyond. This rigid insulation layer, although serving as an additional force-transmitting medium between the inner lining and outer shells, can be subject to deterioration at elevated temperatures since the radial members or spokes are dimensioned to take up the full operational load plus an additional safety factor as if the insulating layer had no force-transmitting capability. The outer shell is provided along its external surface with coolant channels designed to maintain the interface between the double lining and the surrounding concrete body at a temperature no greater than 80° C. when the insulating quality of the layer intermediate the inner lining and the outer shell is insufficient, thereby precluding deterioration of the surrounding concrete body.

5. OBJECTS OF THE INVENTION

It is the principal object of the present invention to provide an improved pressure-retentive lined reinforced-concrete vessel, particularly for a pressurized-fluid nuclear reactor, which will provide improved mechanical stability and safety, freedom from deterioration, insurance against environmental contamination by leakage or through accidental occurrences, etc. at low cost.

It is also an object of our invention to provide an improved pressure-retentive vessel for the purposes described which obviates the aforementioned disadvantages of prior art systems.

It is additionally an object of our invention to extend the principles originally set forth in our above-mentioned copending application.

6. SUMMARY OF THE INVENTION

The above and other objects are attained, in accordance with the present invention, in a pressure-retentive vessel for a nuclear reactor or the like, especially a high-pressure water-cooled reactor which comprises an outer relatively massive concrete shell and a double-wall lining defining a chamber within the shell in which the nuclear reactor core is received, the double-wall lining being provided with a filler of an insulating material as described in accordance with the principles of our co-pending application Ser. No.34,081.

According to the principles of the present invention, the double-wall lining comprises a nonrusting (stainless steel) sheet-metal inner liner of corrugated configuration in force-transmitting relationship with a relatively thick plate-steel outer lining which is spaced therefrom. An important feature of the present invention resides in the construction of the inner lining which may include, in addition to the corrugated inner wall, a support wall closely spaced therearound and means supporting the crests of the corrugations against this support wall.

The support structure, according to the invention, which lies behind each crest or the crest-half undulation of every complete cycle of undulation, consists of profile members whose outer configuration is complementary to the outwardly open trough formed by the respective crest and has radially extending flanges, bands or strips bearing upon the supporting wall. Between these support members, there is defined gaps into which the troughs between the crests yieldably and freely extend. While the profile members are received in the recesses formed by the crests, as noted earlier, and the crests closely fit about these support members, we prefer to provide no other connection between the inner wall and the outer wall of the inner lining.

According to the present invention, moreover, the hermetically-sealed inner wall lies in force-transmitting relationship with the sealed outer liner through spokes, rods or like members which traverse the inter-liner space and are secured to both liners. Advantageously, the spokes extend radially and are vertically and horizontally spaced apart while having, in accordance with the principles of our earlier application, thicknesses or diameters corresponding approximately to the thickness of the outer wall against which they bear. The spokes may be extended beyond the outer liner to form anchors embedded in the concrete of the outer mantle or shell, the support wall or mantle is preferably coaxial and concentric with the outer liner and both may be of cylindrical configuration.

In the system of the present invention, wherein the corrugated inner wall is supported by compartment metal profile members having struts anchored to the outer wall of the inner liner, the corrugation trough between each pair of proximal supported crests is freely movable and constitutes a membrane adapted to yieldably withstand and dissipate or damp mechanical stress in the form of excessive internal pressures, varying internal pressures, and thermal expression and contraction without generating in the direction in which the wall is corrugated, plastic deformations. The corrugated configuration, moreover, creates a structure which is highly yieldable in the direction of corrugation, i.e. transversely of the crests or troughs. For example, when the corrugations run circumferentially of the cylindrical inner lining, expansion and contraction in the axial direction may occur preferentially. On the other hand, when the corrugations run in the axial direction, i.e. along generatrices of the generally cylindrical inner lining, the preferred mode of expansion and stress relief is radial or circumferential.

Preferably, the corrugations are of semicylindrical cross section and the profile support members may have semi-cylindrical portions received in the supported crests while the radially extending struts lie in transverse planes in the case of circumferential crests and troughs, but in axial planes in the case of crests and troughs running along the generatrices of the cylinder. Also, the corrugations may impart a considerable resistance to buckling beyond that which can be attainable with noncorrugated cylindrical shells of the same thickness. As a result, the thickness of the stainless steel inner wall can be reduced proportionally without the danger of buckling. Moreover, assembly of the system is greatly simplified in that no welding or other connection of the inner wall to the profile-support members are used. The inner wall, therefore, constitutes a corrugated membrane which simply lies along and conforms to the contrours defined by the support members.

Advantageously, the profile-support members are rings which may be segments and joined together upon insertion into the outer wall of the inner lining when the crests and troughs lie in planes perpendicular to the axis of the cylindrical vessel. When, however, the crests or troughs run parallel to the axis, i.e. generatrices of the vessel, the profiles may be bars affixed to the outer wall at angularly spaced locations.

If it is assumed that the cylindrical chamber has a vertical axis, the corrugations may lie in vertical or horizontal planes according to the principles of this invention. When the corrugations are vertically spaced troughs, separated by the supported crests, they lie in horizontal planes and the profile members may be rings, segments or other arcuate bodies. On the other hand, when the corrugations are angularly spaced and run in the vertical direction (corresponding to a corrugation direction in the circumferential sense) the profile members are rectilinear. The profile-support members, moreover, should maintain a spacing between the troughs of the corrugations and the support wall of the inner lining such that, upon heating of the vessel, the troughs may expand into the space between the support members without constricting or confinement.

As previously noted, the principles set forth in application Ser. No. 34,081 are equally applicable here and, consequently, a layer of thermal insulation fills the space between the inner and outer liners.

While we have described the present invention in terms of a reinforced-concrete pressure-retentive vessel for nuclear reactors, it should be understood that the principles apply equally to any pressure vessels of large dimensions, e.g. chemical reactors.

7. DESCRIPTION OF THE DRAWING

The above and other objects, features and advantages of the present invention will become more readily apparent from the following description, reference being made to the accompanying drawing in which:

FIG. 1 is a horizontal cross section through a portion of the wall of a reinforced-concrete pressure-retentive vessel for a nuclear reactor illustrating the case in which the corrugations lie parallel to or along generatrices of the cylindrical nuclear reactor chamber; and FIG. 2 is a vertical cross-sectional view, taken in a plane parallel to the axis of the cylindrical chamber, through a portion of the wall of the pressure-retentive vessel, illustrating the case in which the crests and troughs of the corrugations lie in horizontal planes.

8. SPECIFIC DESCRIPTION

In FIG. 1 of the drawing, we have shown a portion of the wall of a pressure-retentive containment for a nuclear reactor which defines a chamber 10 of generally cylindrical configuration receiving the nuclear reactor core and hermetically sealed. The inner liner of this chamber 10 comprises a cylindrical outer support wall 3 of structural steel, i.e. steel which need not be rust-resistance or noncorrodible. The outer wall 3 of the inner liner may be constructed and assembled as described for the inner liner shell in our copending application mentioned earlier. Lying inwardly of this wall 3 is a corrugated inner wall 1 which is supported by profile members 2 upon the outer wall 3. In this embodiment the corrugations form flutes running parallel to the axis, i.e. perpendicular to the plane of the paper in FIG. 1. As can be seen from this Figure, each corrugation cycle comprises a crest 11 of inwardly convex semicircular configuration, thereby defining a semicircular recess 12 facing outwardly. The profile member supporting the crest 11 has a semicylindrical portion 13 precisely complementary to the recess 12 and received therein so that the crest 11 simply lies against the semicylindrical portion 13 and is secured in no other way to the latter than by frictional contact at the interface. From the semicylindrical portion 13, extend two vanes or struts (legs) 14 and 15 which lie substantially in planes parallel to the vertical radial plane through the center 16 of the corrugation and are welded at 17 and 18 to the inner surface of the outer wall 3. Consequently, the struts form the arms of an U-profile support member 2 of channel configuration. Between each pair of support member 2, there is formed a space 19 into which an adjacent trough 20 of the corrugation cycle extends without abutting the support wall 3. With expansion and contraction of the inner wall 1, therefore, the crests 20 may penetrate more or less deeply into the spaces 19. The members 2 are, moreover, vertically extending, parallel and angularly equispaced about the chamber in accordance with the period of the corrugations. The profile members may be composed of structural steel. Of the inner lining, only the inner wall 1, which is hermetically sealed by welding and may be assembled from segments or sheets, not shown, may be composed of stainless steel. The inner wall 1, moreover, may have a thickness which is less than the thickness $t$ of the outer wall 3.

The outer wall 3 is in force-transmitting relationship with the outer shell 5 with which it is coaxial and concentric. The outer shell 5 may also be composed of structural steel, i.e. need not be noncorrodible, and has a thickness T which exceeds $t$ and may be two or more times the latter. The force-transmitting members are spokes 4 which extend radially through the space between the inner lining 1, 2, 3 and the outer lining and may have the configuration of rods of a diameter $d$ corresponding approximately to the thickness $t$.

The rods 4 are welded at 4a to the exterior of the inner lining, namely, at the outer wall 3 thereof and may be vertically and angularly spaced. The spokes pass through openings 21 formed in the outer shell 5, as described in application Ser. No. 34,081 and are welded at 4b to a closure plate 22 overlying the opening and peripherally welded thereto. Coolant pipes 23 are secured to the exterior of the shell 5 to insure that the temperature at the interface of this lining with the surrounding concrete mantle and shell 6 is held below 80°C to prevent deterioration of the concrete. Portions 24 of the spokes 4 extend beyond the outer lining 5 and have arms 26 which are embedded in the concrete to enter the concrete to the lining and vice versa. The space between the inner and outer lining is filled with a thermal insulation 7, e.g. insulating concrete which also in part acts as a force-transmitting medium between the inner lining and the outer lining.

A similar structure is illustrated in FIG. 2 wherein equivalent reference numerals identify similar structure. Here, however, the crests and troughs run along the circumference of the chamber and are vertically spaced; furthermore, the channels 2 have the configuration of rings or circular-arc segments. The cooling pipes 8 run helically along the outer periphery of the outer wall.

The improvement described and illustrated is believed to admit of many modifications within the ability of persons skilled in the art, all such modifications being considered within the spirit and scope of the invention except as limited by the appended claims.

We claim:

1. A pressure-retentive vessel comprising a sealed lining defining a pressure-retaining chamber, and a concrete body around said lining, said lining comprising an outer shell anchored to said body and an inner liner spaced from said outer shell and formed with a corrosion-resistant corrugated inner wall having crests alternating with troughs, and means for supporting the crests of the corrugated inner wall in force-transmitting relationship with said outer shell.

2. The pressure-retentive vessel defined in claim 1 wherein said inner liner further comprises a substantially cylindrical outer wall coaxial with said outer shell and defining a compartment therewith, said means for supporting said crests including a profile member bearing upon said outer wall and received within each crest of said inner wall.

3. The pressure-retentive vessel defined in claim 2 wherein each of said profile members has a portion complementarily received in the underside of the respective crest and a pair of struts extending radially into engagement with said outer wall.

4. The pressure-retentive vessel defined in claim 3 wherein said profile members are formed as channels of U-section with the arms of the U being welded to the interior of said outer wall.

5. The pressure-retentive vessel defined in claim 4, further comprising a multiplicity of spaced-apart spokes traversing said compartment and anchoring said outer wall to said outer shell.

6. The pressure-retentive vessel defined in claim 5 wherein said compartment is filled with force-transmitting thermal insulation.

7. The pressure-retentive vessel defined in claim 6 wherein said spokes extend through said outer shell and are anchored in the concrete of said body.

8. The pressure-retentive vessel defined in claim 7 wherein said chamber has an upright axis and the corrugations extend parallel to said axis.

9. The pressure-retentive vessel defined in claim 7 wherein said chamber has a vertical axis and said corrugations lie in horizontal planes perpendicular to said axis.

* * * * *